United States Patent [19]
Tissot

[11] Patent Number: 5,951,662
[45] Date of Patent: Sep. 14, 1999

[54] SINGLE LATCH SEMAPHORE REGISTER DEVICE FOR MULTI-PROCESSOR SYSTEMS

[75] Inventor: Serge Tissot, la Crau, France

[73] Assignee: Thomson-CSF, Paris, France

[21] Appl. No.: 08/898,429

[22] Filed: Jul. 22, 1997

[51] Int. Cl.⁶ .................................................. G06F 13/14
[52] U.S. Cl. .......................................... 710/107; 710/245
[58] Field of Search .................................. 395/287, 725, 395/595; 710/107; 112/245

[56] References Cited

U.S. PATENT DOCUMENTS

| | | | |
|---|---|---|---|
| 4,380,798 | 4/1983 | Shannon et al. | 364/200 |
| 5,159,686 | 10/1992 | Chastain et al. | 395/650 |
| 5,276,886 | 1/1994 | Dror | 395/725 |
| 5,317,749 | 5/1994 | Dahlen | 395/725 |
| 5,339,443 | 8/1994 | Lockwood | 395/725 |
| 5,428,770 | 6/1995 | Garner | 395/575 |
| 5,526,487 | 6/1996 | Schiffleger | 395/821 |
| 5,594,880 | 1/1997 | Moyer et al. | 395/595 |
| 5,799,195 | 8/1998 | Ross | 395/739 |
| 5,812,876 | 9/1998 | Welker et al. | 395/842 |

FOREIGN PATENT DOCUMENTS

| | | |
|---|---|---|
| 0 261 497 | 3/1988 | European Pat. Off. . |
| 0 463 901 | 1/1992 | European Pat. Off. . |
| 0 464 708 | 1/1992 | European Pat. Off. . |
| 0 543 560 | 5/1993 | European Pat. Off. . |

*Primary Examiner*—Glenn A. Auve
*Assistant Examiner*—Frantz Blanchard Jean
*Attorney, Agent, or Firm*—Oblon, Spivak, McClelland, Maier & Neustadt, P.C.

[57] ABSTRACT

In a multi-processor system, the semaphore device comprises a latch associated by software or hardware to a non-shareable resource. The output of the latch is connected to the bus for the re-reading of the semaphore by the processors. The output of the latch is also connected to an input of a multiplexer connected by its other input to the write bus of the semaphore. The control field output of the latch is connected to an AND gate receiving, at its other input, the control bit of the bus and conditioning, by its output, the writing of the latch. The task seeking to appropriate the semaphore tries to write its unique identifier in the latch with the control field at <<1>>. It then re-reads the semaphore register. Equality between the value re-read and the value written means that the task has succeeded in appropriating the resource. The source is released by the writing of the control field at <<0>>.

4 Claims, 1 Drawing Sheet

SINGLE LATCH SEMAPHORE REGISTER DEVICE FOR MULTI-PROCESSOR SYSTEMS

BACKGROUND OF THE INVENTION

1. Field of the Invention

The present invention relates to a fast semaphore register having secured operation without any specific bus protocol.

In multi-processor systems, it often happens that several processors simultaneously request access to a common resource (such as a screen, printer, etc.). In certain cases, these resources may be accessible simultaneously by several processors. This is the case, for example, with certain memories. In other cases, the resources can be used only by one processor at a time. They are then called non-shareable resources. It is possible to use a "semaphore" which is a memory cell designed to be used by a software program so that, during a certain period of time, a task performed on one or more processors can be sure of having exclusive access to a non-shareable resource of the system. This semaphore function conventionally requires the use of special measures: within processors, this entails the definition and use of particular indivisible or atomic read and write instructions (for example "test and set", "compare and swap", "load and reserve"). On the buses of the processors and the associated sub-buses (in the memories, the input/output circuits and the intercommunication buses), it is necessary to use particular signals (for example "lock" or "RMW", namely "read, modify, write") or particular bus protocols designed to extend the indivisible character of the cycles outside the processors. These specific bus protocols and these particular signal systems very often have the drawback of introducing complexity and time losses into the bus management systems, for example into the arbitration of the bus.

2. Description of the Prior Art

For example, according to the U.S. Pat. No. 5,276,886, there is a known semaphore device for a multi-processor system working in a read mode without any particular bus protocol or specific processor instruction. This device cannot give the number of the task that has switched it over to the "busy" state. This is because of an internal command for the switching over of the state of the semaphore and because it is impossible to take account of action related to the reading of the semaphore.

According to the U.S. Pat. No. 5,317,749, there is a known method for controlling access to a shared resource. This is a purely software method and requires a specific bus protocol.

SUMMARY OF THE INVENTION

An object of the present invention is a semaphore device for a multi-processor system that has to access at least one non-shareable resource, a device that requires no particular hardware protocol for the exchanges with the bus to which it is linked, enabling the establishment, as swiftly as possible and without any ambiguity, of a link between the switch-over of a semaphore to the "busy" state and the task that has prompted this switch-over.

The device according to the invention has a latch comprising at least one control field and one data field, and means to control the writing, in said latch, of data information sent on a first bus to which the different processors of the system are connected, said means being connected to at least one control bit wire of said bus and to the output of the control field of the latch, the data output from the latch being furthermore connected to at least one bus for the re-reading of the latch by the processor or processors and, as the case may be, to a non-shareable hardware resource.

BRIEF DESCRIPTION OF THE DRAWING

The present invention will be understood more clearly from the detailed description of two embodiments, taken by way of non-restricted examples and illustrated by the appended drawing, wherein.

MORE DETAILED DESCRIPTION

The invention is described here below with reference to a multi-processor system connected to a non-shareable resource (such as printer, display screen, software resource, etc.) but it is quite clear that it is not limited to such an application, and that it can be implemented in other systems in which the processing operations must be performed in an exclusive manner, at a given point in time, for each of the different applicants for these processing operations.

Figure 1:
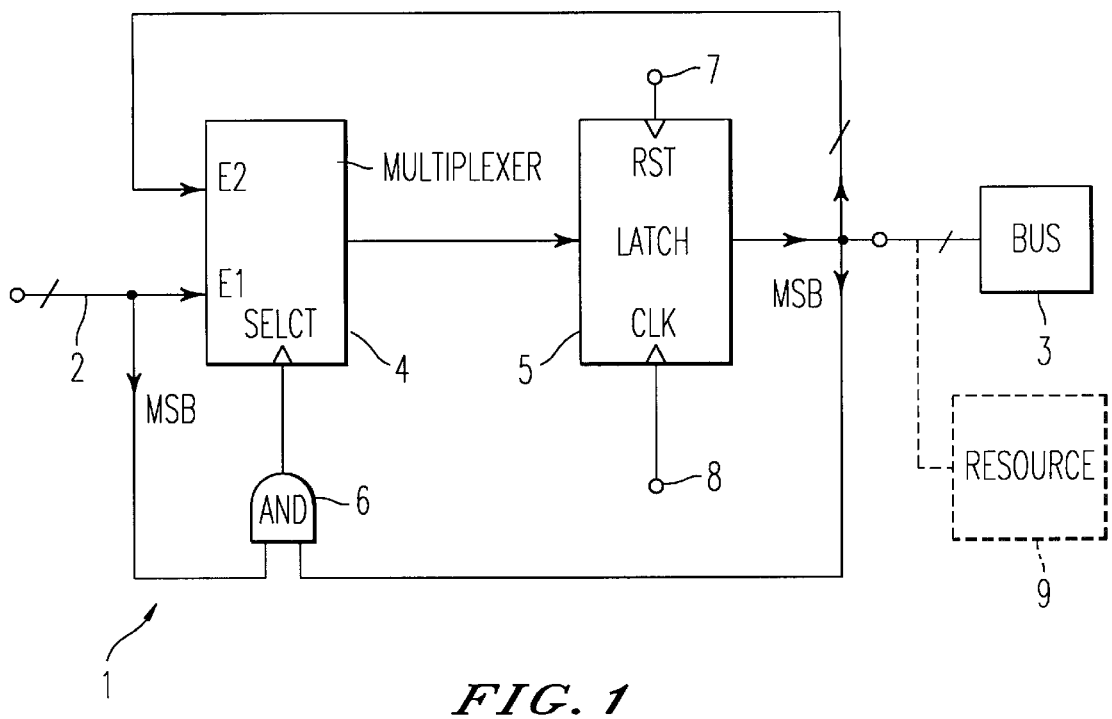
FIG. 1 is a block diagram of a preferred embodiment of the device of the invention.

The semaphore device 1 shown in FIG. 1 is connected, on the input side, to a bus 2 and on the output side at least to one or more buses for the re-reading of the latch by the processors and possibly to a non-shareable hardware resource 9. The different processors (not shown) of the system in which the device 1 is implanted are connected to the buses 2 and 3 (which may be one and the same bus if it is a two-way bus). The buses 2 and 3 are, for example and in a non-restrictive manner, eight-wire buses.

One of the wires, for example the one assigned the most significant bit (MSB), is the wire on which the control signal described here below flows. The seven other wires of this bus convey the given field.

The bus 2 is connected to a first input E1 of a two-input multiplexer 4. The output of the multiplexer 4 (also on eight bits for the above-mentioned example) is connected to the input of a latch 5. At rest, or when the resource 9 is free, the multiplexer 4 connects its input E1 to its output. The output of the latch 5 (also on eight bits for the above-mentioned example) is connected to the second input E2 of the multiplexer 4. The eight data wires of the output of the latch 5 are connected to the latch re-reading bus 3 by the processors, and, possibly, to a non-shareable hardware resource 9. The (MSB) control signal wire for the output of the latch 5 is connected to a first input of an "AND" gate 6, the second input of which is connected to the control signal wire of the bus 2. The output of the gate 6 is connected to the control input (SELECT) of the multiplexer 4. The resetting input (RST) of the latch 5 is connected to a terminal 7 receiving a resetting signal for the latch, for example during the starting-up of the system. The clock signal input (CLK) of the latch 5 is connected to a terminal 8 receiving the latch-writing clock signals from the bus 2.

The above-described device 1 works as follows. When it is started up, a reset signal is sent to the terminal 7, setting all the bits of the latch 5 at zero, especially the MSB, which is the control bit for the semaphore. This control bit, when it is at zero, has the meaning: "resource 9, which is associated with the semaphore by hardware or by software, is free".

At an instant t, any task T1 performed by one at least of the processors of the system seeks to appropriate the resource 9 in order to perform processing operations therein or obtain the performance of processing operations therein. This task T1 sends a level 1 (meaning "conditional writing") on the MSB wire of the bus 2, while at the same time sending its data elements on the other seven wires of the bus 2. Since the input E1 is switched over to the output of the multiplexer 4, the information elements (data elements+ control bit at 1) of T1 reach the latch 5. At the first clock stroke applied to the terminal 8, the latch 5 makes a transfer, to its output, of these information elements which are also at the input E2 of the multiplexer 4. The data elements are immediately available at the re-reading bus 3 and possibly at the non-shareable hardware resource 9, while the MSB control bit (at 1) is at the corresponding input of the gate 6. Consequently, if a conditional write signal coming from the bus 2 (bus 2 MSB at "1") appears, a "1" appears at the output of the gate 6 and causes the switch-over of the multiplexer 4 to its input E2, prohibiting this write operation in the latch 5 so long as the bus 2 control bit is at "1".

The task T1 immediately thereafter, or much later, reads the contents of the semaphore latch 5 (in reading the latch 5 on the bus 3), compares the value thus read with the value written (as sent on the bus 2), ascertains that they are identical and deduces therefrom that the non-shareable resource 9, associated by software or hardware to the semaphore, is indeed assigned to it.

If a task T2, different from T1, had tried to write its information elements in the latch 5 just after T1 (or so long as T1 had not released the source 9), in the same way as T1, it would not have been able to do so for then the comparison between its own information elements (sent on the bus 2) and the contents of the latch 5 (read through the bus 3) would have immediately proved a difference, since the contents of the latch 5 would be those sent previously by T1 (the active input of the multiplexer 4 is E2). Consequently, T2 would have to wait for T1 to send a control bit equal to zero on the bus 2 to obtain the switch-over of the multiplexer 4 to E1, and thus enable T2 to record its contents in the latch 5. The passage to zero of the control bit of T1 means "unconditional writing" and the semaphore reports "resource free".

The data elements other than the control bits sent by the tasks on the bus 2 may be any data elements. They may, for example, be used to encode the task number and/or processor number, thus informing the other tasks about the identity of the entity that has last used the resource 9.

It is important to note that the recording of the information elements (data elements +control bit) in the latch 5 is done in a single clock signal stroke. This enables the immediate association of the "resource busy" information with the identity of the task and/or processor that is occupying the resource and with the information elements that may be transmitted by this task.

Figure 2:
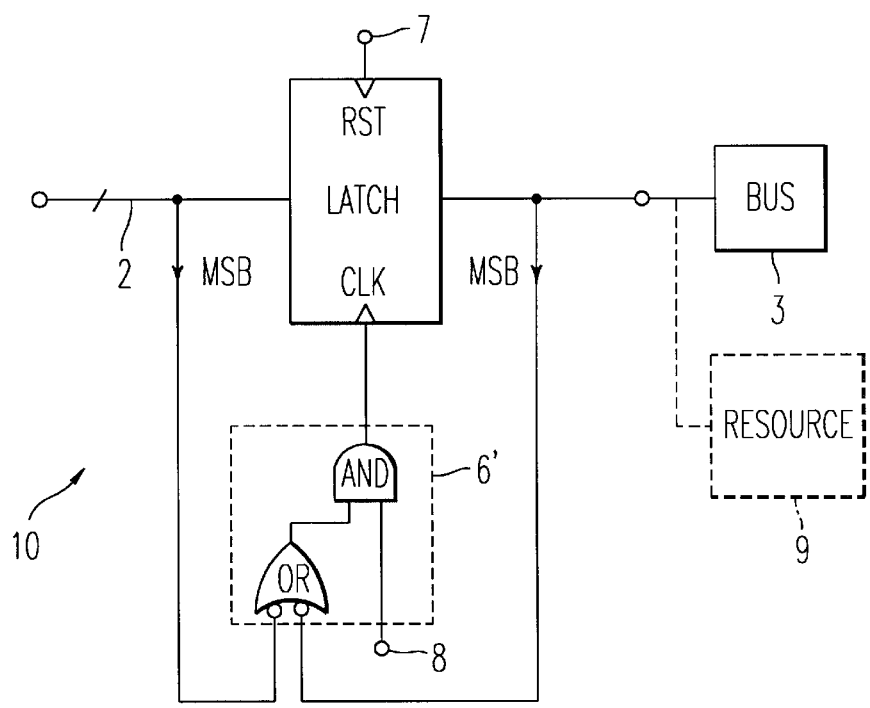
FIG. 2 is a block diagram of an alternative embodiment of the device of FIG. 1.

The device 10 shown in FIG. 2 has the same latch 5 as the device 1 of FIG. 1, but no longer has the multiplexer 4. In this device 10, the MSB wire of the bus 2 and the MSB output of the latch 5 are also connected to the inputs of an OR circuit of the gate 6' which forms a condition of propagation of the positive clock pulse 8 pertaining to an attempt to write in the latch 5.

The device 10 works similarly to the device 1, for the latch 5 transmits its contents to its output, hence to the resource 9, only if the resource 9 is free (MSB wire of latch 5 at "0") or if the writing is unconditional (MSB wire of bus 2 at "0").

It is easy to imagine that the modes of implementation described in FIGS. 1 and 2 may be extended as follows: the condition of writing of the semaphore coming out of the gate 6 (or 6') may be a Boolean combination between all or part of the bits of the bus 2 or all or part of the outputs bits of the latch 5. Thus, for example, the free state of the semaphore may be conventionally encoded by the state 0 of all the output bits of the latch 5. A write signal coming from the bus 2 will be considered to be unconditional if all the bits of the bus 2 are at zero (releasing of the resource); a write signal coming from the bus (2) will be considered to be conditional if at least one of the bits coming from the bus (2) is at <<1>>, the data element then representing, at least partially, the unique identifier, different from 0, of the task attempting to appropriate the semaphore.

Most generally, the system in which the device of the invention is laid out may consist of sub-systems (CPU cards for example) set in clusters, each sub-system or card possibly comprising one or more processors.

In the case of a hardware system associated with an operating system (O.S.) of the symmetrical multi-processor type (several processors associated with a common memory and working with a common O.S.), it is known that a task can be performed without distinction on several processors. The processor number then is not used, since the same task can begin on one processor and end on another.

In a parallel processor system of the "cluster" type, where each O.S. is duplicated, the processor number is used to get rid of identical numbers that might possibly be assigned to two different tasks.

In the device of the invention, the data field must include a unique task identifier or process identifier within the system. This identifier must, at the minimum, be unique among the set of tasks and processors that may access the same non-shareable resource.

The device of the invention has great security of operation. Indeed, when a hardware or software accident occurs on one of the processors or tasks (with a unique identifier) that has obtained the possibility of using the non-shareable resource, and before it has had the time to release the source, a system that is not provided with the device of the invention may remain paralyzed, in a situation where no other task is capable of using the resource. By contrast, the semaphore of the invention enables knowledge at all times of the use of the resource and the task and the processor occupying this resource. If, for example, the task is, "killed" by the O.S., it is easy for the O.S. to release the corresponding semaphore or semaphores. Similarly, if one of the processors or one of the cards of the system has to be reset, it is easy to ascertain that a resource protected by the semaphore of the invention has remained blocked, and then to release this resource.

If, as is taught by the prior art, a memory cell were to be used to record the task number and/or processor number just after the semaphore is taken, it would remain impossible to know the identity of the task and the processor blocking the resource if the operating anomaly were to occur between the taking of the semaphore and the recording of the task and/or processor number. It will be noted that a period of time that may be fairly lengthy could elapse between the taking of the semaphore and the writing of the task number and/or processor number if a disturbance (such as an interruption, bus arbitration, O.S. page numbering etc.) should occur between two events.

The data field of the semaphore, apart from the data elements concerning the task and/or processor number, may include an information field or control field related to the use of the resource. In the most frequent case where the resource is free, as of the first write access, this information field and/or control field (for example: input/output starting command) is available for use by the system and/or its software.

This gives a gain in the request execution time and in the time during which the resource is unavailable for the other tasks as compared with the more conventional method of reading/modification/writing (test and set, for example). This time could possibly be lengthy if a disturbing event (relating to an interruption, bus arbitration, operating system page numbering etc.) were to occur in the task requesting access to the resource between the taking of the standard semaphore and the furnishing of a command/information.

Should the operation be performed in "user" mode, a user level task can easily use the semaphore according to the invention for the following reasons:

no preferred instruction is required;

an exception (interruption, operating system page numbering etc.) may occur at any time without bringing into question the protection of access to the shared resource.

The device of the invention is very simple to implement in hardware terms and can be used on two buses without any particular protocol. Indeed, a simple logic gate to express the write condition and a device to perform this write operation (a multiplexer for example) are enough. This device can be used on any type of bus in heterogeneous environments. The bus or buses merely have to possess data bits and the possibility of carrying out standard read/write cycles and must be used simultaneously to access the semaphore register, by various means including through a computer network.

The typical problem that arises with the semaphores is that of priority of access to the non-shareable resource in the event of requests from several tasks that are very close to one another:

(a)—firstly, it is often desirable to ensure that all the tasks will arrive in an approximately equitable fashion (by rotating priority) or else according to a fixed priority to take the resource;

(b)—secondly, the tasks that await the release of a resource should not generate bus traffic that becomes unnecessary and excessive because it is ascertained, far too often, that the resource is not free.

To obtain this result, it is possible, within the data field of the semaphore, to define a field that quantifies the expected period of time still to be covered for the occupancy of the resource. As and when the occupancy time elapses, this field may be updated (decremented for example) by an additional form of writing (by the task responsible for releasing the resource and not necessarily by the task that has taken it) which is a form of unconditional writing in the latch, leaving the state of the semaphore at <<busy>>(with implementation by an additional bit of the control field or access to the same latch at a different address). It is the task responsible for releasing the semaphore (the task that has taken the semaphore or else a productive task as the case may be) that updates this field.

Any task that sees the semaphore occupied by rereading and comparison of the task/processor number thus, from the very beginning of the occupancy of the semaphore and without any risk of error, knows the amount of time at the end of which it must again seek to appropriate the semaphore. This prevents unnecessary attempts to access the bus. The criterion (b) is thus fulfilled. To fulfil the criterion (a), it is enough for the task to wait for an additional period of time determined as a function of its priority. The lower the priority, the greater will be the additional period of time. If equitable priority access to the resource is desired, it is preferable for the task which sees that the source is busy to introduce a small random period of time in addition to the scheduled period of time and the period of time determined by its priority.

The availability of the scheduled period of time for access to the resource is effective as soon as the semaphore is taken and simultaneously with this event.

A particular implementation of the semaphore register described here above enables the semaphore-taking phase to be limited to a single read cycle on the bus, instead of two read/verification cycles: the least significant bits of the address of the read cycle may be used to convey the value to be written (conditional or unconditional writing) into the semaphore register, which is selected whatever the value of these least significant address bits. Thus, physically, a single read cycle on the bus enables the assumption of control over the semaphore with all the advantages of security, speed and simplicity of implementation described here above.

What is claimed is:

1. A semaphore register device for multi-processor systems, comprising:

a single latch comprising at least one control field and one data field, and means to control writing, in said single latch, of data information sent on a first bus to which the processors of said multi-processor system are connected, said control means being connected to at least one control bit wire of said bus and to the output of the at least one control field of the latch, the data output of the latch being further connected to at least one second bus for the re-reading of the latch by one of said processors and to a non-shareable hardware resource, wherein said control means comprise a multiplexer having a first input connected to the data output of the latch and another input connected to the first bus, an output of the multiplexer being connected to the input of the latch, and an AND gate, one input of which is connected to at least one control bit wire of the bus and another input of which is connected to the output of the control field of the latch, an output of the AND gate being connected to a control input of the multiplexer.

2. A device according to claim 1, wherein the data field comprises at least one of the following data elements: number of the task accessing the resource, number of the corresponding processor, task identifier that is unique among all the tasks likely to seek access, at the same point in time, to the resource, scheduled period still to elapse for the occupancy of the resource.

3. A semaphore register device for multi-processor systems, comprising:

a single latch comprising at least one control field and one data field, and means to control writing, in said single latch, of data information sent on a first bus to which the processors of said multi-processor system are connected, said control means being connected to at least one control bit wire of said bus and to the output of the at least one control field of the latch, the data output of the latch being further connected to at least one second bus for the re-reading of the latch by one of said processors and to a non-shareable hardware resource, wherein said control means includes a circuit comprising gates whose inputs are connected to at least one control bit wire of the first bus and to the output of the control field of the latch to control the propagation of clock pulses to the latch and wherein an output of the gate is connected to a clock input of said latch, a signal input of the latch being connected to the first bus.

4. A device according to claim 3, wherein the data field comprises at least one of the following data elements: number of the task accessing the resource, number of the corresponding processor, task identified that is unique among all the tasks likely to seek access, at the same point in time, to the resource, scheduled period still to elapse for the occupancy of the resource.

* * * * *

UNITED STATES PATENT AND TRADEMARK OFFICE
CERTIFICATE OF CORRECTION

PATENT NO. : 5,951,662

DATED : September 14, 1999

INVENTOR(S): Serge TISSOT

It is certified that an error appears in the above-identified patent and that said Letters Patent is hereby corrected as shown below:

On the title page, item [30] has been omitted. It should be:

--[30]    Foreign Application Priority Data
    Feb. 12, 1997  [FR]  France .............. 97 01598--

Signed and Sealed this

Sixteenth Day of January, 2001

Attest:

Q. TODD DICKINSON

*Attesting Officer*      *Commissioner of Patents and Trademarks*